(No Model.)
C. W. COX & T. E. VAN DYKE.
ELECTRIC LANTERN.
No. 401,417. Patented Apr. 16, 1889.
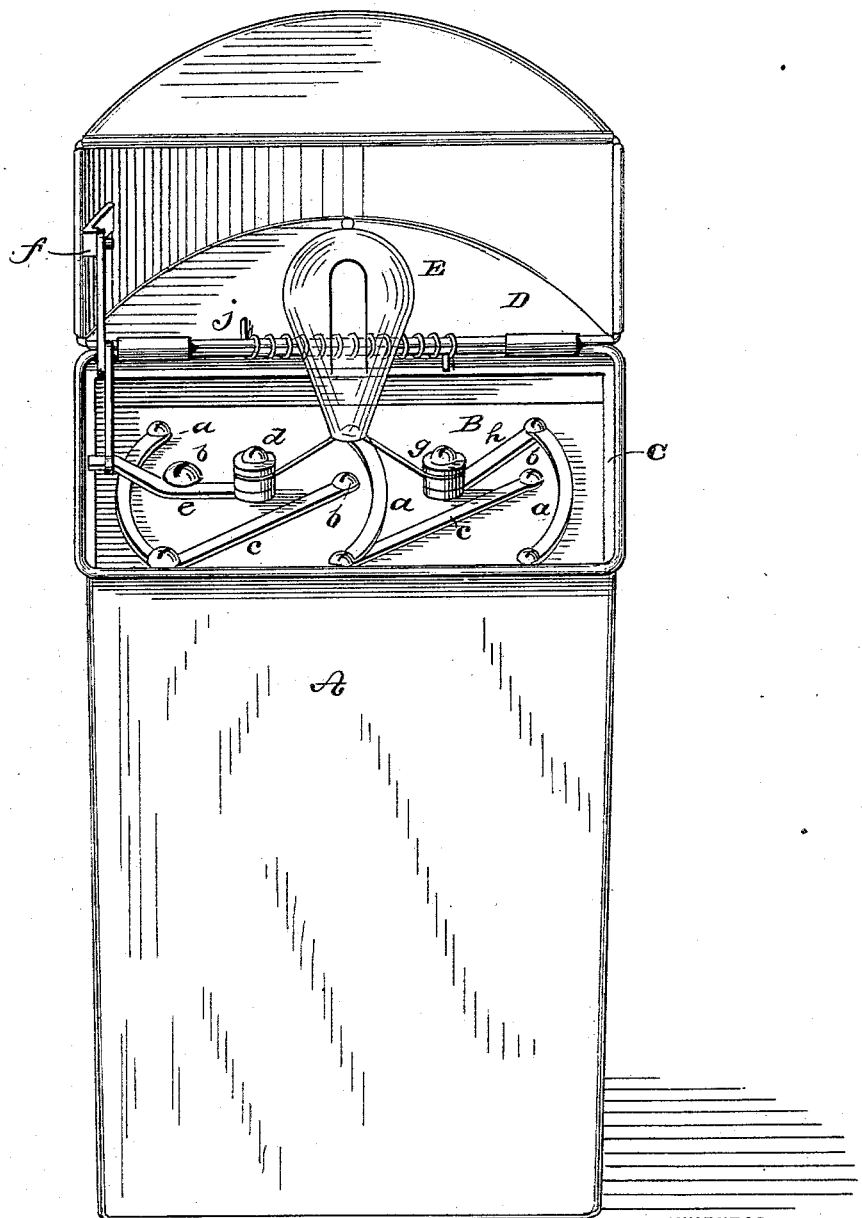
WITNESSES:
C. Sedgwick.
J. M. Ritter.
INVENTOR:
C. W. Cox
T. E. Van Dyke
BY Munn & Co.
ATTORNEYS.

UNITED STATES PATENT OFFICE.

CHARLES WESLEY COX AND THOMAS EUSTACE VAN DYKE, OF PHILADELPHIA, PENNSYLVANIA.

ELECTRIC LANTERN.

SPECIFICATION forming part of Letters Patent No. 401,417, dated April 16, 1889.

Application filed October 27, 1888. Serial No. 289,305. (No model.)

*To all whom it may concern:*

Be it known that we, CHARLES WESLEY COX and THOMAS EUSTACE VAN DYKE, both of Philadelphia, in the county of Philadelphia and State of Pennsylvania, have invented a new and Improved Electric Lantern, of which the following is a specification, reference being had to the accompanying drawing, which is a perspective view of our improved electric lantern.

The object of our invention is to provide a simple and efficient electric lantern to be used in places where a flame would be unsafe.

Our invention consists in the combination, with a suitable casing containing a battery, of an automatic switch arranged to close the circuit as the top of the casing is opened and to open the circuit when the casing is closed, and a lamp placed in the circuit of the battery and arranged in a convenient position for use, all as hereinafter more fully described.

The casing A contains an ordinary battery, B, preferably one having carbon and zinc electrodes and employing electropoin fluid as the exciting medium. The battery B is contained by a cell, C, of acid-proof material, and to the upper plate of the battery are secured curved bars $a$, communicating with the carbon plates, and screws $b$, communicating with the zinc plates, the several elements being connected in series by the straps $c$. To the top of the battery B is secured a binding-post, $d$, connected with the spring switch-arm $e$, adapted to touch the under surface of the head of the screw $b$, and to the cover D of the casing A is attached an arm, $f$, to which is pivoted a bar, $f'$, which is jointed to a bar, $f^2$, pivotally connected with the switch-arm $e$, the arms serving to limit the movement of the cover D.
The arm $f$ engages the switch-arm $e$ when the cover is closed and pushes down the said switch-arm, thereby breaking the electric circuit, causing the lamp to be extinguished.

The binding-post $g$ is connected by the strap $h$ with the carbon terminal of the battery, and between the posts $d$ $g$ is arranged the incandescent electric lamp E, the terminals of which are connected with the said posts $d$ $g$.

The hinged cover D is provided with a spiral spring, $j$, which is adapted to throw the cover open when it is released. When the casing A is closed, the arm $f$ on the cover pushes down the spring switch-arm $e$, so that the circuit of the battery is broken; but when the cover D is released the arm $f$ is carried away from the spring switch-arm $e$, when the said switch rises and completes the circuit between itself and the screw $b$, thus causing the current to flow through the lamp and render it incandescent.

Having thus described our invention, we claim as new and desire to secure by Letters Patent—

1. In an electric lantern, the combination of the opaque casing A, the battery B, the lamp E, and the switch-arm $e$, adapted to be pressed down by the cover of the casing, thereby breaking the circuit, substantially as specified.

2. The combination, with the casing A, provided with the spring-cover D, of the battery B, having posts $d$ $g$, the lamp E, connected with the posts $d$ $g$, the spring switch-arm $e$, and the arm $f$, carried by the cover D, substantially as specified.

CHARLES WESLEY COX.
   THOMAS EUSTACE VAN DYKE.

Witnesses:
 FRED WUNNER,
 EDWIN JOHNSON.